Oct. 29, 1968     D. KRECHMAN     3,408,030
SUPPORT BRACKET
Filed Jan. 3, 1966

DAVID KRECHMAN
INVENTOR.

BY Herzig, Walsh & Blackham
ATTORNEYS

United States Patent Office 3,408,030
Patented Oct. 29, 1968

3,408,030
SUPPORT BRACKET
David Krechman, 329 S. McCarty Drive,
Beverly Hills, Calif. 90212
Filed Jan. 3, 1966, Ser. No. 518,362
4 Claims. (Cl. 248—360)

ABSTRACT OF THE DISCLOSURE

The invention is a support bracket or hook adapted for holding an object from a shelf or ledge. The intermediate part of the bracket or hook is pivotally attached, preferably by way of a hinge to the object to be supported. It has one part or leg that hooks over the shelf and the other part or leg adjustably engages the object so that by adjustment the object can be held securely to the shelf.

---

This invention relates to a novel and unique support bracket for use in supporting articles from a shelf edge, or other device having an extending lip to which an attachment can be made. A preferred exemplary form of the invention is described in detail herein as applied to the support of a music producing instrument such as a tape player from the bottom of the dashboard or cowl of an automobile.

In a preferred form of the invention it takes the form of angular supporting brackets attached by hinges to the devices to be supported. One leg of the angular bracket extends over the device so that it can engage over a supporting edge or lip. The other arm of the bracket carries an adjustable thumbscrew so that by adjusting the thumbscrew the bracket can be rotated about the hinge so that the end of the other arm clamps against the extending lip or edge. Preferably, the end of that arm is made forked to provide a pair of points which securely engage the supporting edge or lip whereby the device to be supported is securely held and mounted.

Preferably, a pair of the angular supporting brackets is used, but it is conceivable that in supporting or mounting certain articles a single one of the brackets may be used.

The object of the invention is to provide an extremely simple, inexpensive, but very effective and versatile supporting bracket means.

A further object is to provide a bracket means as in the foregoing object comprising an angular bracket hinged to the supporting means and having one leg adjustably engageable with the supported devices and the other firmly engageable with the supporting means.

Further objects and additional advantages of the invention will become apparent from the following detailed description and annexed drawings, wherein.

Figure 1:
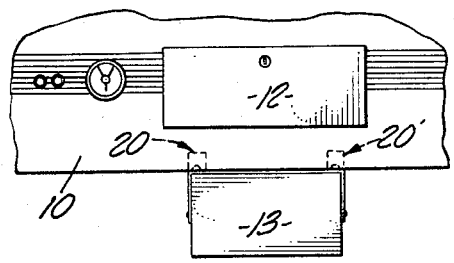
FIG. 1 is a general view of a part of an automobile dashboard with an article supported from it by the bracket means of the invention.
Figure 2:
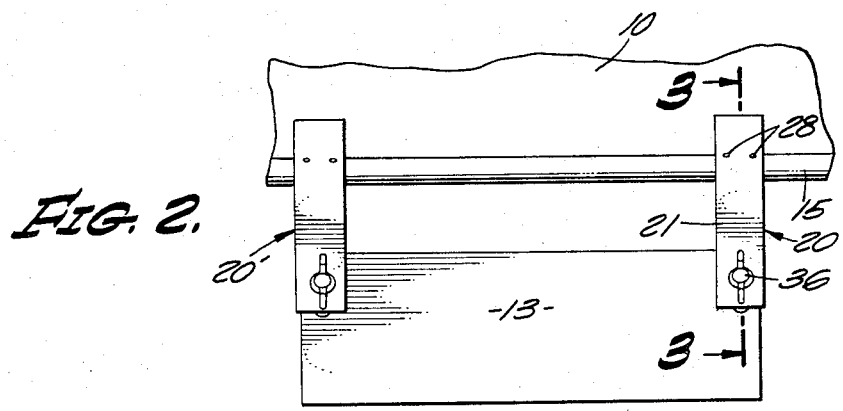
FIG. 2 is an enlarged view showing the brackets supporting an article.
Figure 3:
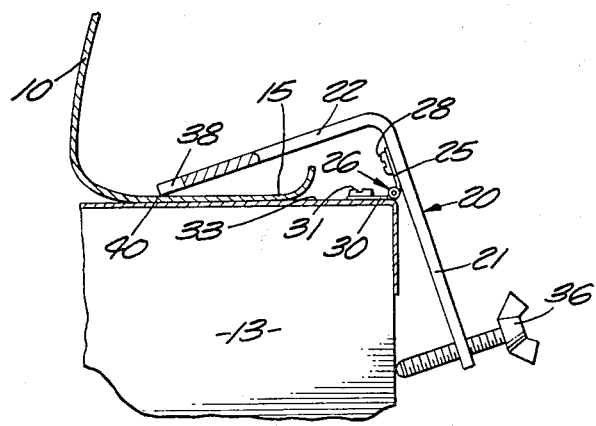
FIG. 3 is a sectional view taken along the line 3—3 of FIG. 2.
Figure 4:
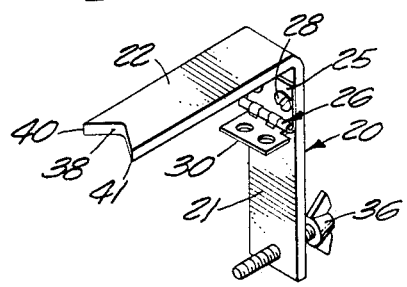
FIG. 4 is a perspective view of an individual one of the brackets.

Referring now to FIG. 1 of the drawings, numeral 10 designates a part of the dashboard of an automobile having a glove compartment with a cover or door 12. The usual instruments are on the dashboard of the automobile. The bottom of the dashboard 10 has an inwardly extending lip or ledge as designated at 15 in FIG. 3. Supported from this ledge is an article 13 which by way of example, as described herein, is a tape player which may be of a conventional commercial type. FIGS. 2, 3 and 4 illustrate in detail the form of the unique bracket means utilized to removably support the tape player 13. Each of the brackets comprises an angular member as designated at 20 having an arm 21 and an arm 22. Preferably, although not necessarily, the arms of the bracket form a right angle. The arm 21 is attached to one leaf 25 of a hinge 26 by means of a screw 28. The other leaf 30 of the hinge 26 is attached by a screw 31 to the top surface 33 of the article being supported, that is, the tape player 13. The arm 21 has extending through it at its end a thumbscrew 36 which is adapted to engage and bear against the back surface of the supported article, that is, the tape player 13.

The arm 22 is preferably forked at its end, as shown at 38, so that there are two pointed ends, as designated at 40 and 41, having relatively sharp corners.

FIGS. 2 and 3 illustrate the manner of supporting the article such as the tape player from underneath the dashboard of the automobile, or other comparable structure having a similar ledge or lip. The tape player 30 is merely placed up against the bottom surface of the ledge 15 with the brackets 20 approximately in the position as shown in FIG. 3. By rotating the thumbscrew 36, the angular brackets are caused to rotate in a counterclockwise direction about the hinge pins of the hinges as shown in FIG. 3. This causes the arms 22 to press down against the upper surface of the lip 15. By reason of the forked ends of the arms 22, sharp corners of the edges 40 and 41 may dig into the material of the lip 15 slightly so that there is provided a very secure and firm support. As will be observed, the construction of the supporting brackets is extremely simple but effective, and very easy to use. Furthermore, the brackets are easy, simple and inexpensive to fabricate and produce, and yet their structure is such that they are adapted for use in a wide range of different types of structures and environments, the brackets having a range of adjustment suitability to these different adaptations.

The second bracket 20' is identical to the bracket 20.

From the foregoing, those skilled in the art will observe that the invention as described herein achieves and realizes all of the objects and advantages as set forth in the foregoing as well as having many additional advantages which are apparent from the detailed description.

The foregoing disclosure is representative of a preferred form of the invention and is to be interpreted in an illustrative rather than a limiting sense, the invention to be accorded the full scope of the clams appended hereto.

I claim:
1. Means for supporting an article having an upper surface and an adjacent side surface from a shelf-like support having top and bottom surfaces, with said upper surface bearing against said bottom surface, said means comprising: a substantially rigid angular bracket member having a first leg extending over and spaced from said upper surface and a second leg extending generally downwardly adjacent said side surface; means pivotally mounting said second leg of said bracket member, adjacent but below the juncture of said legs, on said article about an axis generally parallel to said upper and side surfaces; and clamping means for urging said second leg outwardly of said side surface to thereby urge said first leg toward said upper surface to engage the top surface of said support and clamp the same against said upper surface.

2. Means as defined in claim 1 wherein said pivotal mounting means comprises a hinge having one leaf thereof secured to said second leg spaced from said juncture and the other leaf thereof secured to said article.

3. Means as defined in claim 1 wherein said clamping means comprises a screw threaded through said second leg and bearing against said side surface.

4. Means as defined in claim 1 wherein said first leg is formed to define two laterally spaced and downwardly extending points at its end remote from said second leg.

References Cited

UNITED STATES PATENTS

| 2,080,261 | 5/1937 | Funk | 248—226 |
| 2,556,615 | 6/1951 | De Vaughn | 248—226 |
| 2,584,927 | 2/1952 | Sanborn | 248—360 |
| 2,726,837 | 12/1955 | Jameson | 248—311 |
| 3,189,187 | 6/1965 | Guyer | 248—311 |

CHANCELLOR E. HARRIS, *Primary Examiner.*